Patented Aug. 7, 1934

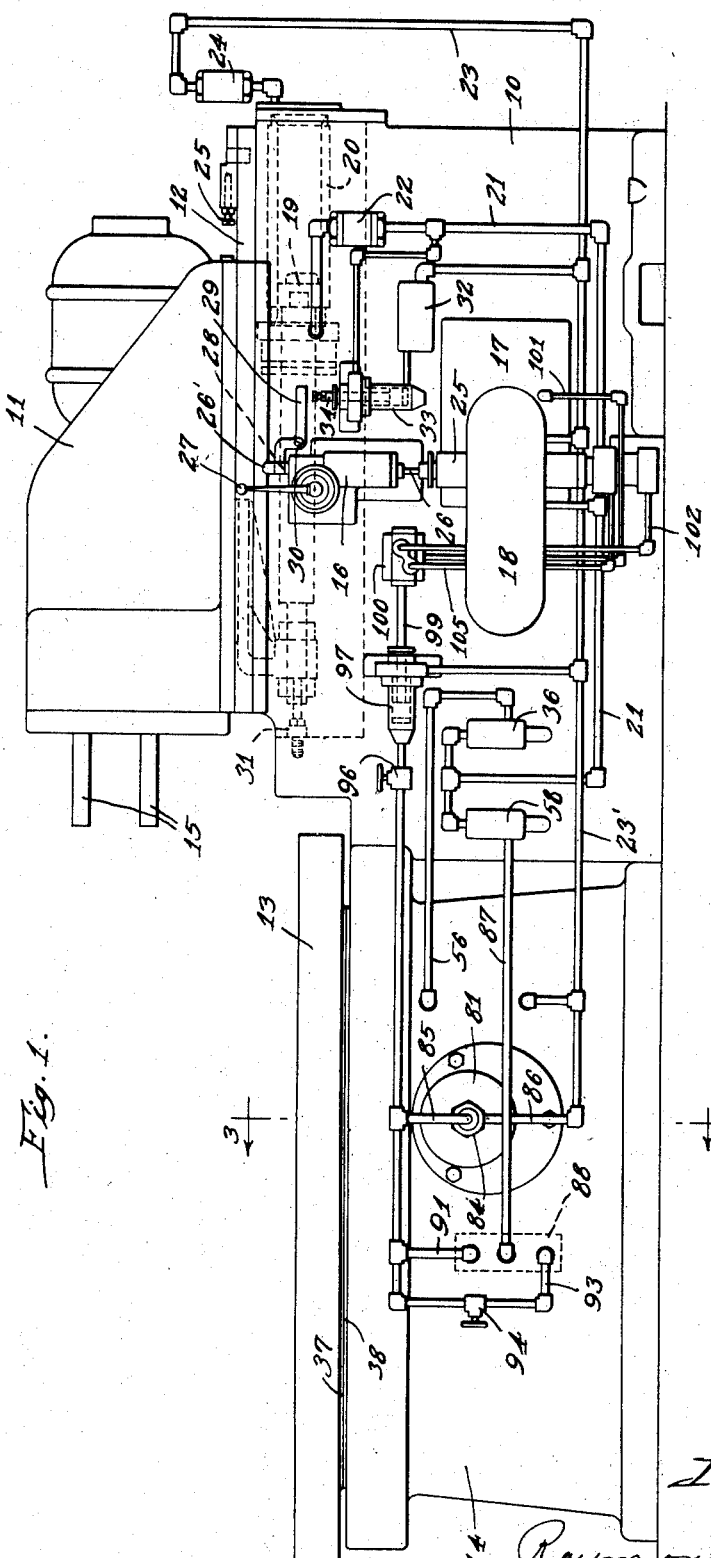

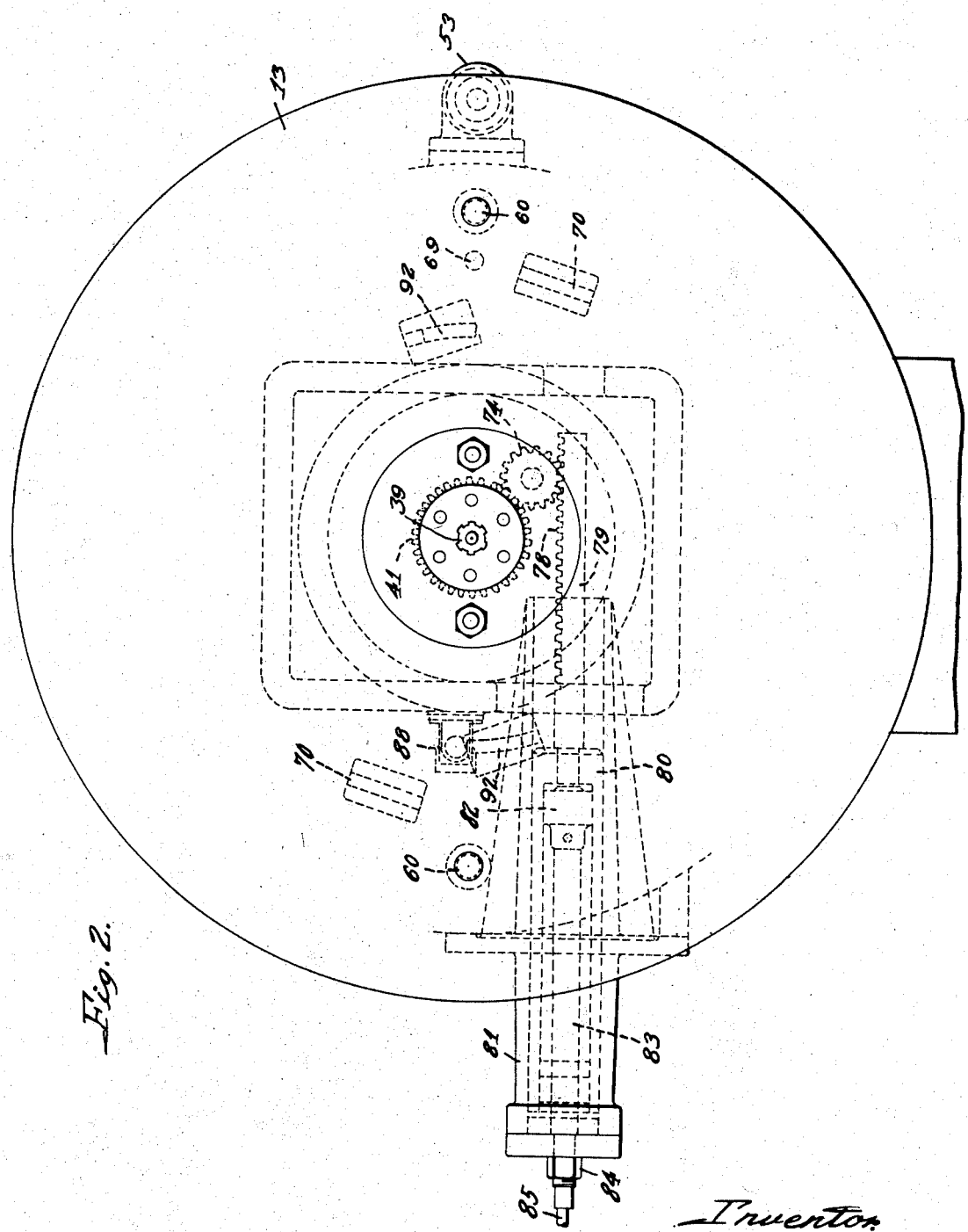

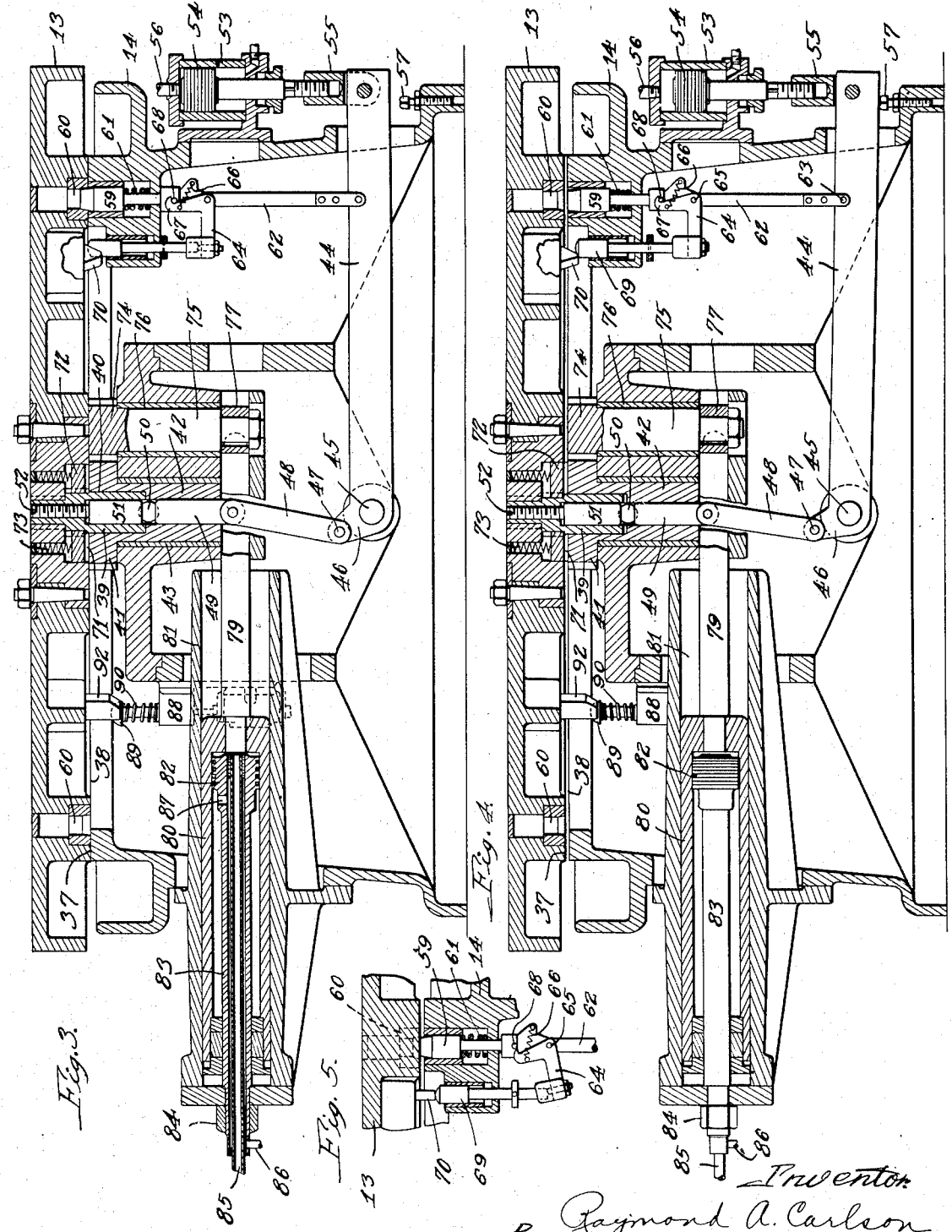

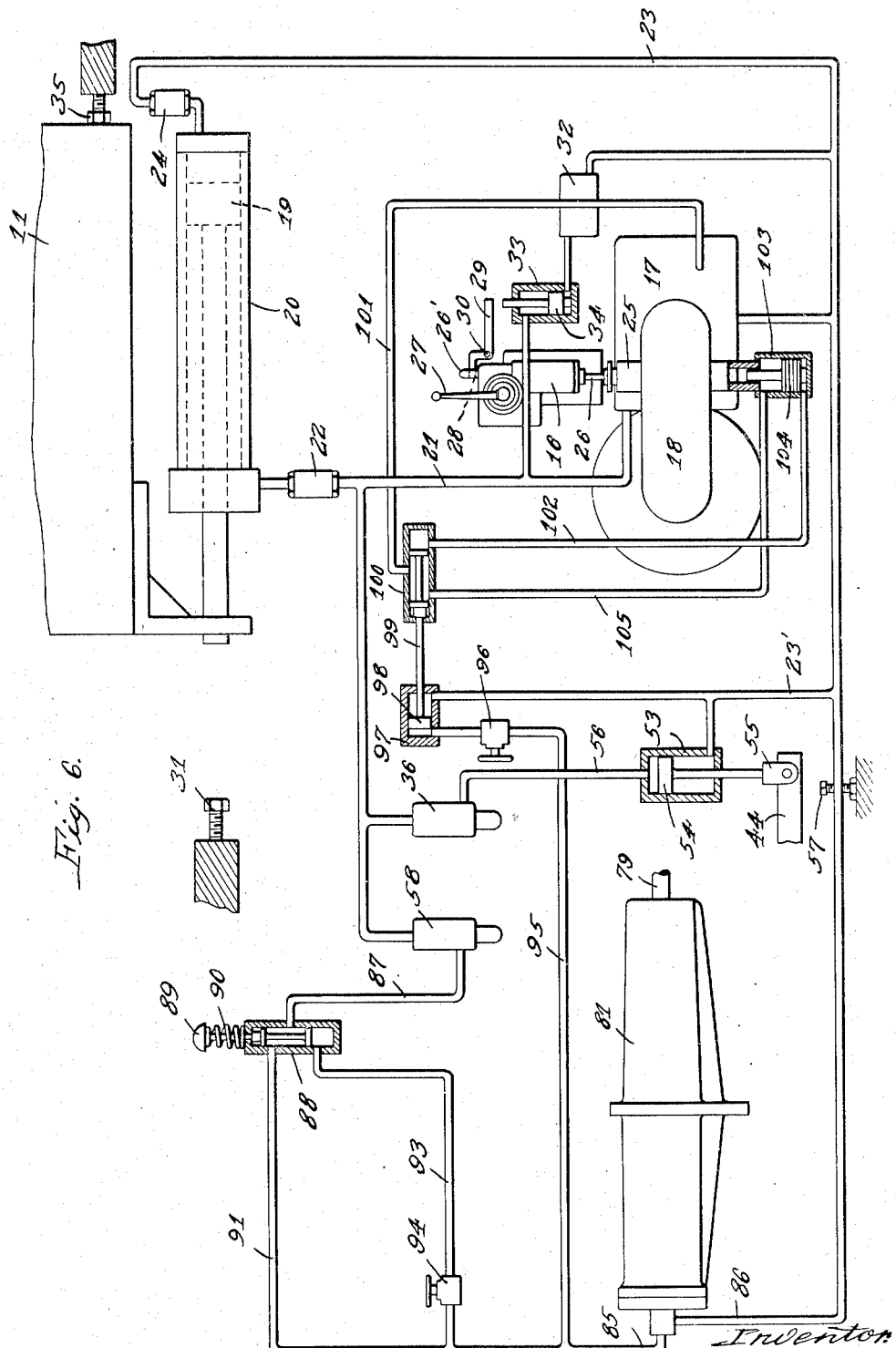

1,968,990

UNITED STATES PATENT OFFICE 1,968,990

HYDRAULICALLY INDEXED MACHINE TOOL

Raymond A. Carlson, Rockford, Ill., assignor to Rockford Drilling Machine Co., Rockford, Ill., a corporation of Illinois Application July 8, 1931, Serial No. 549,340

15 Claims. (Cl. 77—32)

This invention relates to hydraulically operated machine tools generally and is principally concerned with hydraulically operated indexing means.

Hydraulic indexing means available in the past were so designed that the stroke of the indexing ram had to be accurately predetermined so as to bring the table to a certain definite position whereupon a locking pin was operated, usually hydraulically, to lock the table. This made the indexing more or less uncertain because the slightest wear or excess play would prevent such exact registration of the pin and socket as was relied upon. It is, therefore, the principal object of my invention to provide a hydraulically operated indexing means utilizing a spring-pressed locking pin released automatically prior to the instant of registration of the pin and socket to enter the socket upon registration, no attempt being made to predetermine the stroke of the ram to secure exact registration. To make this method of indexing more practical the oil flow to the ram cylinder is automatically diminished shortly before the instant of registration so that the table is turning slowly enough to allow the pin to enter the socket without danger of shearing or causing any jar.

A salient feature of this invention consists in the fully automatic control of the operation of the machine by the use of positive stops limiting the movement of most of the hydraulically operated parts, and the use of foot valves in the various portions of the hydraulic circuit, the opening of which upon the building up to predetermined pressures in the line takes care of the automatic operation of one part after another of the hydraulically operated means. Thus, the tool carriage moves forwardly until it engages a stop whereupon pressure is built up in the line to a predetermined point to take care of the automatic tripping of the control valve for the return of the carriage; then the carriage has return movement until it engages a stop, whereupon pressure is built up in the line to a predetermined point to automatically take care of the operation of the table lifting plunger; then a positive stop is engaged in the movement of said plunger and pressure in the line is built up further to take care of the automatic operation of the table indexing ram, and, finally, when the ram has moved far enough to complete the indexing of the table and the table is locked in its new position, pressure is again built up in the line to take care of the automatic shifting of the main control valve back to the starting position, for repetition of the cycle of tool carriage movement and table indexing just described.

The invention is illustrated in the accompanying drawings, in which—

Figure 1 is a front view of an indexing table type boring machine embodying my invention;

Fig. 2 is a plan view of the table showing certain important parts of the invention in dotted lines therebeneath;

Fig. 3 is a vertical cross-section on the line 3—3 of Figure 1;

Fig. 4 is a view similar to Fig. 3 showing the table lifted and about to be indexed;

Fig. 5 is a sectional detail showing the locking pin released ready for entry in the socket therefor in the table, and Fig. 6 is a hydraulic circuit diagram of the machine.

The same reference numerals are applied to corresponding parts throughout the views.

Referring first to Figure 1, the numeral 10 designates the bed of the boring machine having the head or tool carriage 11 reciprocable thereon on ways 12 toward and away from the work table 13 mounted on a base 14 next to the bed 10. The table 13, as will soon appear, is arranged to be lifted clear of the base 14 and indexed a half turn after each reciprocation of the head 11, either to perform the same operation on the other end of a piece of work or permit the performance of the same operation on a new piece during the removal of a finished piece and the substitution of another piece. It is obvious that while the machine illustrated is a boring machine of a multiple spindle type, as indicated at 15, the invention is not to be regarded as limited to boring or any other specific machine tool operation, but is applicable generally to machine tools wherein a table, whether it be a work table or tool carrying table, is arranged to be indexed.

A control box 16 forming the subject matter of my copending application, Serial No. 340,208, filed February 15, 1929, is provided in connection with the oil pump 17. The latter, in this case, happens to be an oilgear QS pump, such as that disclosed in Ferris Patent 1,753,562, issued April 8, 1930, the same being driven by an electric motor mounted in the bed 10 and connected with the pump through a chain and sprocket connection inside the guard 18. Similarly as illustrated and described in another copending application, Serial No. 471,987, filed July 31, 1930, the head 11 has a piston 19 attached thereto and reciprocable in a hydraulic cylinder 20 mounted in the bed 10 and having one end thereof connected with the pump 17 by a pipe 21 and foot valve 22, and the other end connected with the pump through another pipe 23 and foot valve 24. The control box 16 has a plunger extending therefrom for direct connection with the valve 25, as indicated at 26, the valve 25 being of a reciprocable plunger type. A hand lever 27 provided on the control box has connection with a pinion inside the box meshing with a rack carried on the plunger 26, as described in my first mentioned copending application. An extension of the plunger 26 appears at 26' and directly behind this is another plunger 28 arranged to be depressed by means of the bell crank lever 29 pivoted, as at 30, alongside the control box. The plunger 28, as described in the first mentioned copending application, cooperates with a spring-actuated load and fire mechanism in the control box so that depression of the plunger 28 results in abrupt movement of the plunger 26 from the position to which it may be moved by the lever 27, past neutral position to a reverse position. Thus, so far as the cycle of movement of the head 11 is concerned, when the operator moves the lever 27 to the left from the vertical neutral position shown the plunger 26 is raised to cause the pump 17 to deliver oil through the pipe 23 to the cylinder 20 and thereby cause the head to move forwardly. As oil enters the right end of the cylinder 20 oil is discharged from the left end through the foot valve 22 and pipe 21 back to the sump of the pump 17. At a predetermined point the head encounters a positive stop 31 which prevents further movement. This causes a building up in pressure in the line 23 to a point high enough to overcome the resistance of a foot valve 32 and oil is thereupon delivered to a small cylinder 33 to raise the plunger 34 and actuate the bell crank lever 29 so as to depress the plunger 28 and bring about the shifting of the plunger 26 of the valve 25 past neutral to reverse position. Oil is thereupon delivered from the pump 17 through pipe 21 to the left end of cylinder 20 to return the head 11, oil being at the same time allowed to escape from the right end of the cylinder 20 through valve 24 and pipe 23 to the sump of the pump 17. The plunger 34 in cylinder 33 during such operation is returned to its normal position by delivery of oil to the other end of the cylinder from pipe 21. The return movement continues until the head engages another positive stop 35 whereupon the pressure in the line 21 is caused to build up until it overcomes the resistance of a foot valve 36 identified with the hydraulic indexing means forming the subject matter of this application, and which will now be described in detail.

The table 13 has a flat annular bearing surface 37 provided on the bottom thereof arranged to rest on the flat annular ledge 38 provided on top of the base 14. The table is arranged to be turned relative to the base with its downwardly projecting stem 39 as a center. The upper end of the stem is splined for connection with the center of the table, and the lower end has a working fit in a bearing 40 provided therefor in the center of an indexing gear 41. Since the gear 41 has its hub 42 fitting in a central bearing 43 in the base 14 it follows that the table 13 is centered with respect to the base 14. A treadle 44, pivoted at 45 in the base 14, has an arm 46 projecting upwardly therefrom for pivotal connection at 47 with a link 48 to form a toggle by means of which the table is arranged to be lifted off the base upon depression of the treadle, for indexing purposes. The upper end of the link 48 is pivotally connected with a plunger 49 slidably received in a center hole in the hub 42 of the indexing gear 41. A ball 50 fits between the upper end of the plunger 49 and a pin 51 fitting in a center hole in the stem 39 under a screw 52 threaded downwardly through the upper end of the stem. When the treadle 44 is depressed the plunger 49 lifts a table 13 and the latter is then arranged to turn freely on the ball 50. In many machines made in the past a treadle corresponding to the treadle 44 was provided for a similar purpose but arranged to be depressed and held down by foot pressure during the indexing of the table, which was also in most cases arranged to be done manually. In accordance with my invention, however, a small hydraulic cylinder 53 is provided on the base 14 preferably at the back of the machine having a piston 54 reciprocable therein and suitably connected with the outer end of the treadle 44, as by means of a clevis 55. A pipe 56 provides connection between the upper end of the cylinder 53 and the foot valve 36 mentioned above. Thus, when pressure in the line 21 is built up at the end of the return movement of the head 11 enough to overcome the resistance of the valve 36, oil is delivered to the cylinder 53 to force the piston 54 downwardly for depression of the treadle 44, whereby to lift the table 13 clear of the base 14 for the purpose of indexing the same. A stop 57 limits the movement of the treadle 44 when the table 13 is at a predetermined elevation with respect to the pipe 14 (see Fig. 4). Pressure is, therefore, arranged to build up in the line 21 to a still higher point until it overcomes the resistance of another foot valve 58 (see Fig. 6), whereby to automatically take care of the indexing of the table 13, as will be described presently.

It will be observed in Figs. 3 and 4 that a locking pin 59 is slidably mounted in the base 14 for entry in either of two sockets 60 provided therefor in the bottom of the table 13 at diametrically opposed points and that a spring 61 fitting about the reduced shank of the pin tends normally to urge the same upwardly for entry in whichever socket is brought into registration therewith. A plunger 62 is pivoted at 63 to the treadle 44 and is arranged, as will soon appear, to withdraw the locking pin 59 from the socket 60 when the treadle is depressed to lift the table, whereby to unlock the table for indexing. The plunger 62 is, however, detachably connected with the locking pin 59 by means of a latch 64 pivoted on the plunger at 65, the said latch being normally urged toward locking position by means of a spring 66 to engage a hook 67 on the latch with a pin 68 projecting laterally from the lower end of the locking pin 59. The latch 64 is arranged to be released against the action of spring 66 by depression of a plunger 69, cams 70 being provided at diametrically opposed points on the bottom of the table 13 for cooperation with the plunger 69 in the manner illustrated in Fig. 5. In operation, the locking pin 59 is withdrawn from a socket 60 when the treadle 44 is depressed to lift the table. Then, at a predetermined point in the indexing movement of the table, one of the cams 70 encounters the plunger 69, as illustrated in Fig. 5, and causes the latch 64 to release the pin 59. The latter is thereupon urged upwardly by its spring 61 and rides on the flat bearing surface 37 on the bottom of the table 13 until the socket 60 comes into registration with the pin, when the pin enters the socket and locks the table against further movement. The taper on the pin and the corresponding taper in the socket facilitate entry of the pin in the socket, and it will soon appear how, although the indexing is taken care of hydraulically, the movement of the table is slowed down just prior to the moment of registration, whereby to further facilitate entry of the pin in the socket and eliminate danger of shearing of the pin or causing excessive shock and jar.

The indexing movement of the table 13 is secured by turning the indexing gear 41. The latter, as indicated in Figs. 3 and 4, has ratchet teeth 71 on the top thereof meshing with other teeth in a ratchet plate 72 keyed or splined on the stem 39 and normally urged downwardly by springs 73 for meshing engagement of the ratchet teeth. When the gear 41 is turned in a clockwise direction, as viewed in Fig. 2, it turns the table 13 with it through the medium of the plate 72. However, when the gear 41 is turned in a counterclockwise direction in the return movement of the ram, the table 13 having been locked by the pin 59, as previously described, the ratchet teeth on the plate 72 ride idly over the ratchet teeth 71 on the gear 41, against the action of the spring 73. A pinion 74 meshes with the gear 41 and is provided on the upper end of a stud 75 mounted in a bearing 76 in the base 14. A pinion 77 is keyed on the lower end of the stud 75 and meshes with rack teeth 78 provided on the side of a ram 79. The latter is arranged to be operated hydraulically and for this purpose has a working cylinder 80 connected therewith and slidable in a guide 81 mounted in the base. A piston 82 fits in the cylinder 80 and is rigidly mounted on the guide 81 by attachment of the outer end of its hollow rod 83 to said guide, as indicated at 84. A pipe 85 provides communication with the cylinder 80 in front of the piston 82 through the head of said piston, as shown in Fig. 3, and another pipe 86 has communication with the cylinder 80 on the opposite side of the piston 82 through the piston rod 83 and port 87 provided in the rod immediately behind the piston. Thus, when oil is delivered under pressure through pipe 85 the ram 79 is moved in one direction to index the table 13, the oil in the cylinder on the other side of the piston being allowed to escape through pipe 86 by way of port 87. Return movement is secured by delivery of oil through pipe 86, the oil on the other side of the piston in that case being allowed to escape through pipe 85.

When pressure in the line 21 builds up enough to overcome the resistance of foot valve 58 oil is delivered through pipe 87 to a valve 88. The plunger 89 of the valve 88 is normally held in the position shown in Fig. 6 by means of a coiled compression spring 90. In that position of the plunger oil is delivered from the valve 88 through pipe 91 and pipe 85 to the cylinder 80 whereby to move the ram 79 in the proper direction to index the table 13. At a predetermined point in the indexing movement, one of two cams 92 provided on the bottom of the table 13 at diametrically opposed points encounters the plunger 89 and depresses the same against the action of spring 90, whereby to cut off the flow of oil through pipe 91 and cause the oil to flow instead through another pipe 93 which communicates with the pipe 85 through an adjustable needle valve 94, the purpose of which is to restrict the flow of oil so as to slow down the indexing motion of the table and avoid bringing too much of a shock on the locking pin 59 when the latter enters the socket 60. In other words, the table is slowed up in its indexing movement prior to registration of the socket 60 with the locking pin, thus insuring easy entry of the locking pin in the socket and also avoiding excessive shock and jar. Further movement of the ram 79 being prevented upon entry of the locking pin 59 in its socket 60, the oil finds escape through a pipe 95 and another adjustable needle valve 96 into a small cylinder 97 and thereby causes movement of a plunger 98 attached to the stem 99 of a valve 100. The valve 100 is supplied with oil from the gear pump section of pump 17 through a pipe 101 and when the valve is shifted, as just stated, oil is delivered through pipe 102 to the lower end of a small cylinder 103 to force the piston 104 upwardly to shift the plunger 26 of the valve 25 back to the starting position to repeat the cycle of operations described, starting with the delivery of oil from pump 17 through pipe 23 to the cylinder 20 for the forward movement of the head 11 and so forth. Due to the resistance of the valve 24 oil also finds its way through pipe 23' into the lower end of cylinder 53 to raise the piston 54 and thus permit the table 13 to seat itself squarely on the base 14. Oil also flows through pipe 86 into the cylinder 80 to bring the ram 79 back to its normal retracted position. At the same time oil also finds its way into the cylinder 97 from pipe 23' to shift the plunger 99 of valve 100 back to the position shown in Fig. 6 whereby to deliver oil through pipe 105 to the upper end of the cylinder 103 to return the plunger 104 to the position shown in Fig. 6. These four operations occur simultaneously during an almost imperceptible pause of the head 11 just prior to its moving forward for the commencement of the next cycle of operations. The cycles are repeated automatically until the operator returns the lever 27 to neutral position in which position the plunger 26 of the valve 25 is so disposed that oil from the pump 17 is by-passed so that none is delivered to the cylinder 20.

It is believed the foregoing description conveys a good understanding of all of the objects and advantages of my invention. The appended claims have been drawn to cover all legitimate modifications and adaptations coming properly within the spirit and scope of the invention.

I claim:

1. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery at normal operating pressure from the pump to the cylinder, a positive stop for engagement by the carriage at one end of its movement whereby pressure is arranged to be built up in the cylinder above normal operating pressure, a foot valve responsive to such a higher pressure and communicating with the cylinder whereby to be opened after the carriage engages the stop, table lifting means, a secondary working cylinder for operating said table lifting means dependent for its communication with the fluid supply pump upon the opening of the foot valve, whereby the table is lifted after the foot valve is opened, and means for indexing said table when lifted.

2. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery from the pump to the cylinder, a pressure responsive foot valve communicating with the fluid circuit of said valve means between the pump and the cylinder, there being a positive stop for engagement by the carriage at one end of its movement whereby pressure is arranged to be built up in that portion of the circuit communicating with the foot valve, table lifting means, table indexing means, a secondary working cylinder for operating each of said table lifting and indexing means, and control means when a predetermined pressure is attained and opens the foot valve, to deliver fluid successively to the table lifting and table indexing means, whereby to lift and then index the table.

3. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery from the pump to the cylinder, pressure responsive valve means communicating with the fluid circuit of the aforesaid valve means between the pump and the cylinder, there being a positive stop for engagement by the carriage at one end of its movement whereby pressure is arranged to be built up in that portion of the circuit communicating with the pressure responsive valve means, table lifting means, a secondary working cylinder for operating the latter means, table indexing means, and another secondary working cylinder for operating the latter means, said secondary working cylinders being arranged to have fluid delivered thereto from said circuit when a predetermined pressure is attained and opens the pressure responsive valve means.

4. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery from the pump to the cylinder, a first pressure responsive foot valve and a second pressure responsive foot valve, said foot valves communicating with the fluid circuit of said valve means between the pump and the cylinder, there being a positive stop for engagement by the carriage at one end of its movement whereby pressure is arranged to be built up in that portion of the circuit communicating with the pressure responsive valve means, table lifting means, a secondary working cylinder for operating the latter means arranged to have fluid delivered thereto from said circuit when a predetermined pressure is attained and opens the first foot valve, table indexing means, and another secondary working cylinder for operating the latter means arranged to have fluid delivered thereto from said circuit when a higher predetermined pressure is attained and opens the second foot valve, whereby to index the table after the same has been lifted.

5. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery from the pump to the cylinder, a pressure responsive foot valve communicating with the fluid circuit of said valve means between the pump and the cylinder, there being a positive stop for engagement by the carriage at one end of its movement whereby pressure is arranged to be built up in that portion of the circuit communicating with the foot valve, table indexing means, a secondary working cylinder for operating said table indexing means and arranged to have fluid delivered thereto from said circuit when a predetermined pressure is attained and opens the foot valve, a control valve in the fluid circuit between the foot valve and the working cylinder normally occupying one position permitting a high rate of fluid delivery to the cylinder but arranged to be shifted to another position allowing a low rate of fluid delivery to said cylinder, and means for automatically shifting the valve to the latter position at a predetermined point in the indexing movement of the table.

6. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery from the pump to the cylinder, a pressure responsive foot valve communicating with the fluid circuit of said valve means between the pump and the cylinder, there being a positive stop for engagement by the carriage at one end of its movement whereby pressure is arranged to be built up in that portion of the circuit communicating with the foot valve, table indexing means, a secondary working cylinder for operating said table indexing means and arranged to have fluid delivered thereto from said circuit when a predetermined pressure is attained and opens the foot valve, a control valve in the fluid circuit between the foot valve and the working cylinder normally occupying one position permitting a high rate of fluid delivery to the cylinder but arranged to be shifted to another position allowing a low rate of fluid delivery to said cylinder, table locking means arranged to lock the table to the base when the table reaches a predetermined position in its indexing movement, and means for automatically shifting the control valve to its low rate fluid delivery position in its indexing movement before the table reaches said predetermined point.

7. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery from the pump to the cylinder, a pressure responsive foot valve communicating with the fluid circuit of said valve means between the pump and the cylinder, there being a positive stop for engagement by the carriage at one end of its movement whereby pressure is arranged to be built up in that portion of the circuit communicating with the foot valve, table indexing means, a secondary working cylinder for operating said table indexing means and arranged to have fluid delivered thereto from said circuit when a predetermined pressure is attained and opens the foot valve, a control valve in the fluid circuit between the foot valve and the working cylinder normally occupying one position permitting a high rate of fluid delivery to the cylinder but arranged to be shifted to another position allowing a low rate of fluid delivery to said cylinder, table locking means for locking the table element in indexed position to the support element comprising a spring-pressed locking pin on the one element arranged to enter a socket therefor provided in the other element when the pin and socket come into registration in the indexing movement of the table, and a cam on the table arranged to shift the control valve to its low rate fluid delivery position in the indexing movement of the table at a predetermined point prior to registration of the pin and socket.

8. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery from the pump to the cylinder, a pressure responsive foot valve communicating with the fluid circuit of said valve means between the pump and the cylinder, there being a positive stop for engagement by the carriage at one end of its movement whereby pressure is arranged to be built up in that portion of the circuit communicating with the foot valve, table lifting means including a treadle, a secondary working cylinder arranged to have fluid delivered thereto from the fluid circuit when a predetermined pressure is attained and opens the foot valve, whereby to cause depression of the treadle to lift the table for indexing purposes, table locking means comprising a locking pin mounted in the base having spring means normally tending to urge the same upwardly to locking position, and sockets provided in the table for reception of the pin in different indexed positions of the table, means having a detachable connection with the locking pin and operatively connected with the treadle whereby to retract the pin when the table is lifted for indexing, there being a latch member providing the detachable connection between the pin and the last mentioned means, and means arranged to be operated automatically at a predetermined point in the indexing movement of the table to operate the latch and release the pin for actuation thereof by its spring means.

9. A structure as set forth in claim 8 including table indexing means, and another secondary working cylinder associated therewith arranged to have fluid delivered thereto from said fluid circuit after the table has been lifted whereby to index the same.

10. A structure as set forth in claim 8 including table indexing means, another secondary working cylinder associated therewith arranged to have fluid delivered thereto from said fluid circuit after the table has been lifted whereby to index the same, a control valve for controlling the fluid delivery to said last mentioned cylinder, said valve normally occupying a position allowing a certain rate of fluid delivery to the cylinder but being arranged to be shifted to another position allowing a low rate of fluid delivery to the cylinder, and means arranged to automatically shift said valve to the latter position at a predetermined point in the indexing movement of the table prior to registration of a socket with the locking pin.

11. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of a main valve means for controlling the fluid delivery from the pump to the cylinder, a secondary valve means for controlling the fluid delivery from the pump for other purposes, table lifting means, a secondary working cylinder for operating the latter means arranged to have fluid delivered thereto from the secondary valve means, table indexing means, another secondary working cylinder for operating the latter means and arranged to be supplied with fluid from the secondary valve means, and means for controlling the fluid delivery to the last mentioned cylinder, whereby to cause the operation of the table indexing means after completion of the operation of the table lifting means.

12. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of a main valve means for controlling the fluid delivery from the pump to the cylinder, a secondary valve means for controlling the fluid delivery from the pump for other purposes, table lifting means, a secondary working cylinder for operating the latter means arranged to have fluid delivered thereto from the secondary valve means, table indexing means, another secondary working cylinder for operating the latter means and arranged to be supplied with fluid from the secondary valve means, means for controlling the fluid delivery to the last mentioned cylinder, whereby to cause the operation of the table indexing means after completion of the operation of the table lifting means, table locking means arranged to lock the table to the base when the same has been indexed a predetermined amount, a control valve controlling the fluid delivery to the working cylinder of the table indexing means, the same normally allowing a predetermined rate of fluid delivery but being arranged to be shifted to another position allowing a lower rate of fluid delivery to said cylinder, and means for automatically shifting said valve at a predetermined point in the indexing movement of the table prior to the point of locking thereof.

13. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery at normal operating pressure from the pump to the cylinder, a positive stop for engagement by the carriage at one end of its movement whereby pressure is arranged to be built up in the cylinder above normal operating pressure, a foot valve responsive to such a higher pressure and communicating with the cylinder whereby to be opened after the carriage engages the stop, table lifting means, a secondary working cylinder for operating said table lifting means dependent for its communication with the fluid supply pump upon the opening of the foot valve, whereby the table is lifted after the foot valve is opened, table indexing means, another foot valve responsive to a still higher pressure and communicating with the table lifting cylinder whereby to be opened after the table is lifted, another secondary working cylinder for operating the indexing means arranged to have fluid delivered thereto from said fluid circuit upon opening of the last mentioned foot valve whereby to index the table, a control valve for controlling the fluid delivery to said last mentioned cylinder, said valve normally occupying a position allowing a certain rate of fluid delivery to the cylinder but being arranged to be shifted to another position allowing a lower rate of fluid delivery to the cylinder, and means arranged to automatically shift said valve to the latter position at a predetermined point in the indexing movement of the table.

14. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery at normal operating pressure from the pump to the cylinder, a positive stop for engagement by the carriage at one end of its movement whereby pressure is arranged to be built up in the cylinder above normal operating pressure, a foot valve responsive to such a higher pressure and communicating with the cylinder whereby to be opened after the carriage engages the stop, table lifting means, a secondary working cylinder for operating said table lifting means dependent for its communication with the fluid supply pump upon the opening of the foot valve, whereby the table is lifted after the foot valve is opened, table indexing means, another foot valve responsive to a still higher pressure and communicating with the table lifting cylinder whereby to be opened after the table is lifted, another secondary working cylinder for operating the indexing means arranged to have fluid delivered thereto from said fluid circuit upon opening of the last mentioned foot valve whereby to index the table, and means for regulating fluid delivery to said last mentioned cylinder.

15. The combination with a machine tool comprising a supporting base, a carriage reciprocable on one portion of said base, a table supported for indexing movement on another portion of said base, a working cylinder associated with the carriage to communicate movement thereto, and a pump for supplying fluid under pressure to the cylinder, of valve means for controlling the fluid delivery at normal operating pressure from the pump to the cylinder, a positive stop for engagement by the carriage at one end of its movement whereby pressure is arranged to be built up in the cylinder above normal operating pressure, a foot valve responsive to such a higher pressure and communicating with the cylinder whereby to be opened after the carriage engages the stop, table lifting means, a secondary working cylinder for operating said table lifting means dependent for its communication with the fluid supply pump upon the opening of the foot valve, whereby the table is lifted after the foot valve is opened, table indexing means, another foot valve responsive to a still higher pressure and communicating with the table lifting cylinder whereby to be opened after the table is lifted, and another secondary working cylinder for operating the indexing means arranged to have fluid delivered thereto from said fluid circuit upon opening of the last mentioned foot valve whereby to index the table.

RAYMOND A. CARLSON.